United States Patent
Magnuson

(10) Patent No.: US 6,739,228 B1
(45) Date of Patent: May 25, 2004

(54) PROCESS FOR MINIMIZING WASTE DURING PROCESSING OF A LENGTH OF STOCK

(75) Inventor: James M. Magnuson, Kankakee, IL (US)

(73) Assignee: Peddinghaus Corporation, Bradley, IL (US)

( * ) Notice: Subject to any disclaimer, the term of this patent is extended or adjusted under 35 U.S.C. 154(b) by 182 days.

(21) Appl. No.: 09/661,006

(22) Filed: Sep. 13, 2000

(51) Int. Cl.[7] .............................. B26D 5/20; B26D 3/00
(52) U.S. Cl. .............................. 83/42; 83/75.5; 83/76.8; 83/209; 83/241; 83/363; 83/367; 83/DIG. 2
(58) Field of Search ................................ 83/35, 36, 39, 83/42, 52, 75.5, 76.6, 76.7, 76.8, 76.9, 209, 241, 255, 256, 363, 364, 367, 369, 371, 445, 436.3, 436.4, 54, DIG. 2; 72/294, 14.8, 307; 700/171

(56) References Cited

U.S. PATENT DOCUMENTS

| | | | |
|---|---|---|---|
| 2,905,242 A | * 9/1959 | Heffner | 83/210 |
| 2,958,243 A | * 11/1960 | Foster | 72/11.5 |
| 3,170,355 A | * 2/1965 | Neely, Jr. | 83/362 |
| 3,466,958 A | * 9/1969 | Munson | 83/76.4 |
| 3,552,163 A | * 1/1971 | Lloyd | 72/11.5 |
| 4,100,829 A | * 7/1978 | Stangl et al. | 83/106 |
| 4,255,993 A | * 3/1981 | Stubbings | 83/76.8 |
| 4,318,321 A | * 3/1982 | De Mattos | 83/75.5 |
| 4,526,073 A | * 7/1985 | Elhaus | 83/15 |
| 4,534,002 A | * 8/1985 | Urban | 700/171 |
| 4,559,819 A | 12/1985 | Deppe et al. | |
| 4,559,854 A | * 12/1985 | Jurgens | 83/170 |
| 4,720,318 A | 1/1988 | Lines | |
| 4,787,281 A | * 11/1988 | Gardner | 83/15 |
| 4,805,500 A | * 2/1989 | Saito et al. | 83/277 |
| 4,840,207 A | 6/1989 | Lines | |
| 4,944,206 A | * 7/1990 | Guy et al. | 83/42 |
| 5,086,678 A | * 2/1992 | Aoyagi et al. | 83/13 |
| 5,390,716 A | * 2/1995 | Gonner et al. | 144/175 |
| 5,511,402 A | 4/1996 | Kauffman | |

OTHER PUBLICATIONS

Sketches A, B, and C, no dates found, Admitted Prior Art by Applicant.
Peddinghaus advertising sheet for Anglemaster Model AFPS 623, no date found, Admitted Prior Art.
Peddinhaus advertising sheet for AFPS–623–K Anglemaster, no date found, Admitted Prior Art.
Document entitled "Description Of Prior Art Known To Applicant," pp. 1 and 2.

* cited by examiner

Primary Examiner—Boyer D. Ashley
(74) Attorney, Agent, or Firm—Wood, Phillips, Katz, Clark & Mortimer

(57) ABSTRACT

A process is provided for minimizing waste during processing of a length of stock into one or more shorter usable segments, where in connection with the processing station upon which the length of stock is processed, the length of stock has a minimum handling length. The waste is minimized by mapping the remnant segment at a position other than the last segment at the trailing end of the length of stock. The last segment at a trailing end of the length of stock is alternatively defined as one of the usable segments having a length greater than the minimum handling length.

9 Claims, 4 Drawing Sheets

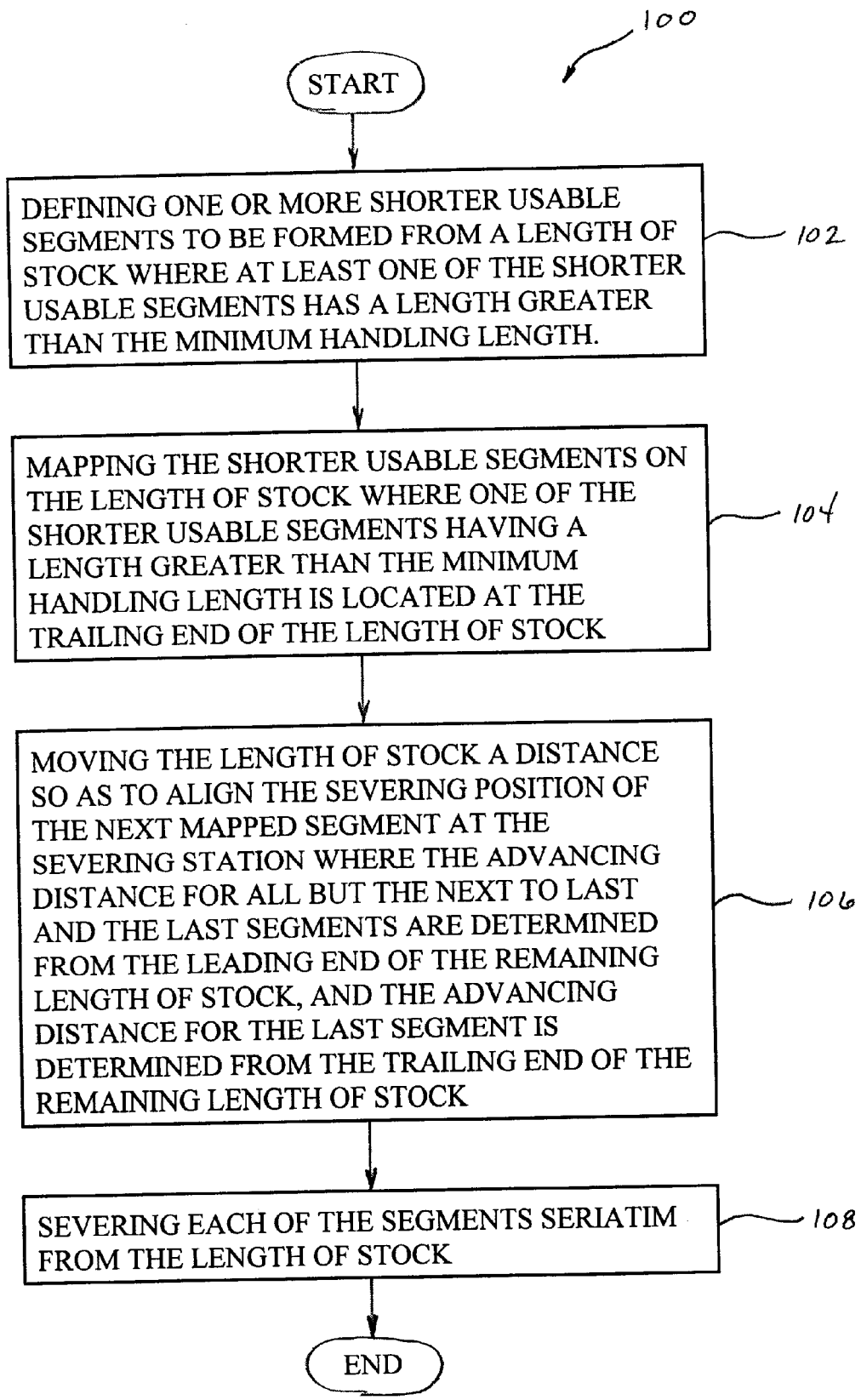

PROCESS FOR MINIMIZING WASTE DURING PROCESSING OF A LENGTH OF STOCK

TECHNICAL FIELD

This invention relates to a process for minimizing waste during processing of a length of stock, including, for example, structural steel shapes, such as I-beam, channel, angle iron, and bar stock, into one or more shorter length segments. More specifically, the process increases the amount of material available for forming smaller usable segments.

BACKGROUND OF THE INVENTION AND TECHNICAL PROBLEMS POSED BY THE PRIOR ART

In conventional "cut to length" structural beam fabrication shops employing a steel fabrication line, beams are typically automatically conveyed through an assembly of punch presses for punching holes in the beams and a shearing device for severing the beams into multiple, smaller (i.e., shorter) length segments. One example of beams that are processed in this manner has a central web and two parallel flanges, where each flange is arranged at opposite ends of the web. Such beams are typically designated as I-beams, wide flange beams, light beams, and American standard beams. When such beams are erected in structures, the ends of the beams and/or other portions of the beams are typically connected together with bolts. The bolts are received in holes provided in the webs and flanges of the beams.

One conventional method for providing the holes in a beam is to punch the holes with one or more conventional punch presses. "Web" punch presses are used to provide holes in the beam web, and "flange" punch presses are used to provide holes in the beam flanges. Such punch presses may have conventional designs well-known to those skilled in the art. Various designs are disclosed in U.S. Pat. Nos. 4,631,996, 3,722,337, and 3,720,125.

One conventional method for forming one or more shorter segments from a length of stock is to sever the shorter segments from the length of stock with a shearing apparatus. Such shearing apparatus may have conventional designs well-known to those skilled in the art. One example of a possible design is disclosed in U.S. Pat. No. 5,394,782.

A family of models of commercially successful structural beam punch and shear combination systems is marketed in the United States of America by Peddinghaus Corporation, 300 North Washington Avenue, Bradley, Ill. 60915 U.S.A. under the trade name "Anglemaster" and can be used as part of a structural steel fabrication line. The Peddinghaus brochure 08/94 AFCPS describes the Model AFCPS-623-K, and the Peddinghaus brochure 07/88 ASP describes the Model AFPS 623.

Generally, for "cut to length" fabrication lines, the operator starts with raw stock of a standard fixed length. In connection with processing a length of stock including structural steel shapes, such as I-beam, channel, angle iron, and bar stock, the raw stock commonly comes in a fixed length of 40 feet. Other standard fixed lengths can often also be available, wherein a maximum standard fixed length of 60 feet is common. From the standard fixed lengths of raw stock, shorter beam segments of desirable length can be produced.

In order to minimize waste, during production of the shorter length beams from the raw stock, operators of cut-to-length lines look to their production requirements including the quantity and corresponding lengths of the shorter segments required to complete the job order. An operator then plans the production of the parts bearing in mind the standard length of raw stock that the operator is working with, and attempts to organize production of the parts to maximize use of the raw stock, thereby minimizing waste.

As each useable segment is severed, the length of raw stock remaining for forming further shorter useable segments is correspondingly reduced. At some point the remaining length of raw stock will be too short to produce any further useable segments. The length of raw stock remaining after all of the shorter usable segments have been severed is generally referred to as the remnant, and is often discarded as scrap.

Prior processes for producing multiple shorter segments from a longer length of raw stock have typically required a minimum amount of scrap, which can not be processed or used in forming the usable shorter segments. One reason for this has been the result of certain physical limitations of the fabrication line, where a minimum length of material at the trailing end of the raw stock is required for handling purposes. Consequently, many operators, when determining the length of material available for forming shorter segments, automatically deduct from the starting length of raw stock a length equivalent to the minimum handling length. This insures a length of raw stock is always available for handling purposes at the end of the length of raw stock as each shorter usable segment is severed.

A further difficulty in determining the length of material available for forming shorter segments corresponds to the fact that the actual starting length of the raw stock can vary within certain tolerances. In at least one example the actual starting length for at least one source of 40-foot I-beam stock, when received from the mill, can vary by as much as a quarter of an inch under or as much as three-quarters of an inch over. As a result, when planning the formation of the shorter usable segments from the longer length of raw stock, the possible tolerances need to be taken into consideration.

A still further factor which may not always be able to be accurately anticipated corresponds to losses during processing. Each of the resulting shorter cut-to-length segments can further have a tolerance plus or minus of up to one-sixteenth of an inch.

Consequently, when planning the shorter usable segments to be produced from the corresponding lengths of raw stock, prior processing methods have generally identified the length of material available for forming shorter usable segments by deducting from the overall length of raw stock an amount equal to or greater than the minimum handling length. By doing this, it was assured that an amount equal to the minimum handling length was available at the end of processing for handling purposes by the fabrication line.

For a fabrication line having a minimum handling length of eight inches and working with raw stock having a starting length of approximately forty feet, after subtracting the minimum handling length from the overall length of raw stock, the length of material available for forming smaller usable segments would be approximately thirty-nine feet, four inches.

Almost always the individual shorter segments that are needed will not add up exactly to the length of the available material, which length, in the above noted example, is thirty-nine feet, four inches. Consequently, the unused portion of the available length of material will be added as scrap to the already reserved eight inches of material corresponding to the minimal handling length. In prior processes, it was frequently observed that if the amount of material corresponding to the minimum handling length had been available for use, a further usable segment could have been formed.

In view of the above-discussed disadvantages of the prior art processing, it would be beneficial to develop a process which would maximize the amount of material available for forming the shorter usable segments, thereby minimizing the waste during processing of a length of stock.

SUMMARY OF THE INVENTION

The present invention provides a novel process for minimizing waste during processing of a length of stock into one or more shorter usable segments.

In at least one aspect of the invention, the process is performed in a system including a processing path along which the length of stock having a leading end and a trailing end travels, and a severing station located along the processing path for severing shorter usable segments from the length of stock. The system typically has a minimum handling length.

The process provides for defining one or more shorter usable segments having an aggregate length, plus any processing loss, which is less than or equal to the length of stock. Furthermore, the one or more shorter usable segments are defined so as to provide at least one shorter usable segment having a length greater than the minimum handling length. The shorter usable segments are then mapped onto the length of stock so as to locate the at least one shorter usable segment having a length greater than the minimum handling length as the last segment at the trailing end of the length of stock. The length of stock is then advanced and the segments are severed, seriatim, therefrom.

According to one aspect of the invention, a process is provided where the difference between the sum of the lengths of the shorter usable segments and the length of the length of stock corresponds to a remnant section. When the length of the remnant section is less than the minimum handling length, the remnant section is mapped at a position other than the last segment.

According to another aspect of the invention, the remnant section is mapped as the next to last segment.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 4 is a flow diagram illustrating a process in accordance with the present invention.

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with the process of this invention is described in the normal (upright) operating position, and terms such as upper, lower, horizontal, etc., are used with reference to this position. It will be understood, however, that the apparatus of this invention may be manufactured, stored, transported, used, and sold in an orientation other than that described.

The apparatus operating in accordance with the process of this invention can have certain conventional components and control mechanisms the details of which, although not fully illustrated or described, will be apparent to those having skill in the art and an understanding of the necessary functions of such components and mechanisms.

Some of the Figures illustrating an embodiment of the apparatus operating in accordance with the process of the present invention show conventional structural details and mechanical elements that will be recognized by one skilled in the art. However, the detailed descriptions of such elements are not necessary to an understanding of the invention, and accordingly, are herein presented only to the degree necessary to facilitate an understanding of the novel features of the present invention.

The Processing System

Figure 1:
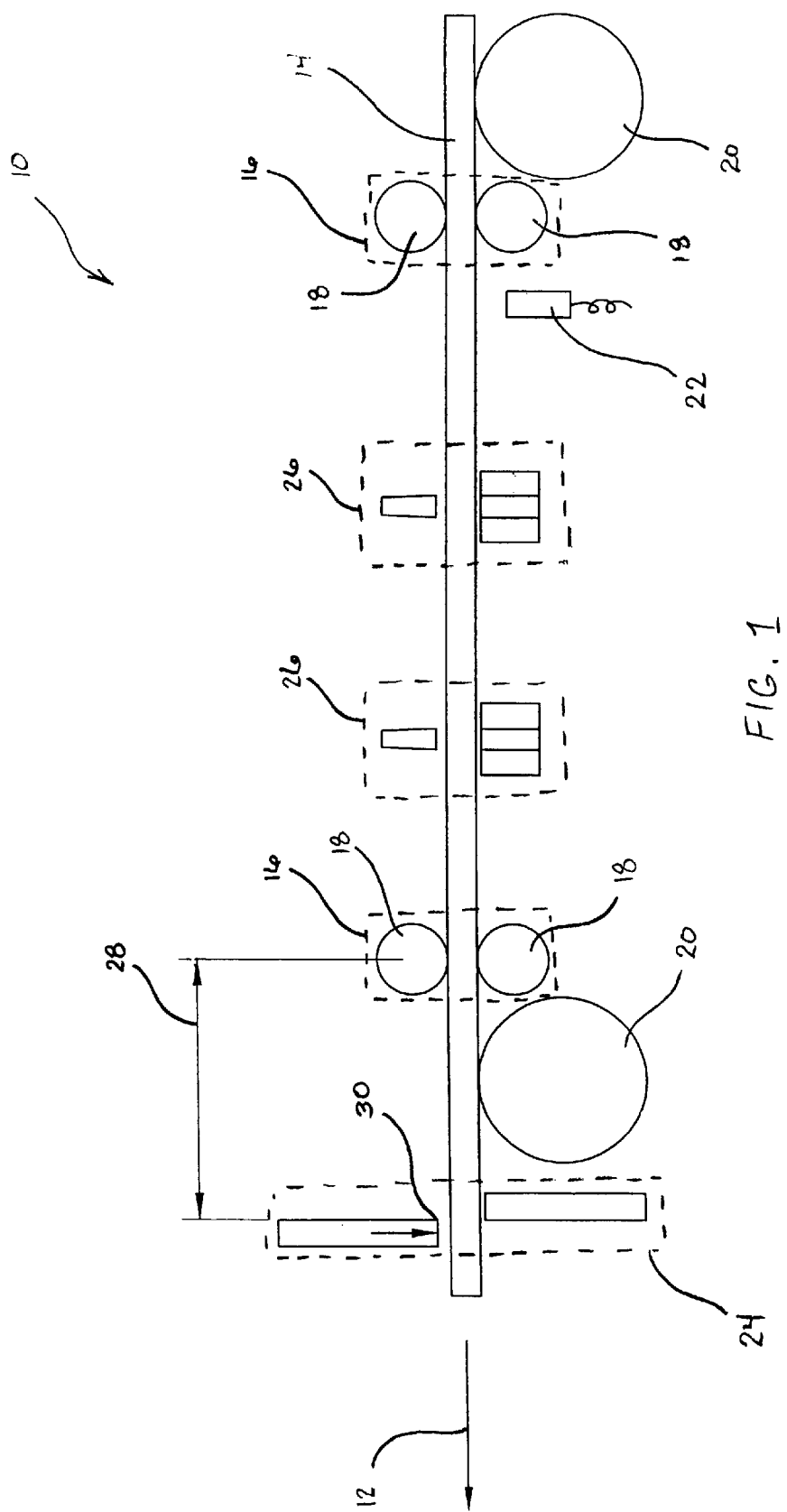
FIG. 1 is a schematic diagram of a typical machine layout of a processing system, operating in accordance with the process of the present invention.
Figure 2:
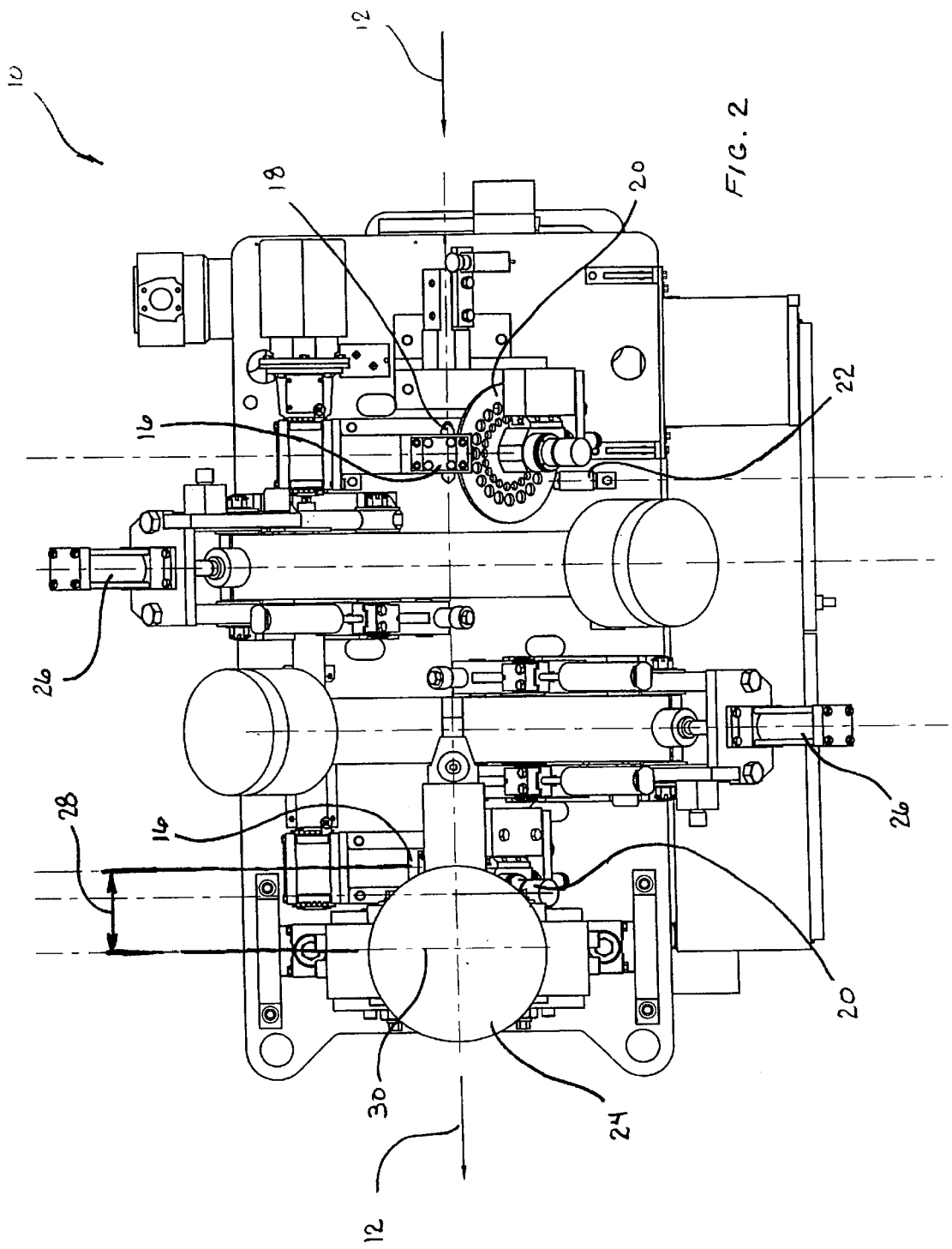
FIG. 2 is a more detailed top plan view of a processing system corresponding to the diagram illustrated in FIG. 1.

FIGS. 1 and 2 show a typical machine layout for a processing system 10 for operating in accordance with the process of the present invention. For ease of illustration, some of the components and assemblies of system 10 have been omitted. Specifically, FIG. 1 illustrates the processing system 10 in a simplified schematic diagram form, while FIG. 2 illustrates a more detailed top plan view of one possible embodiment of the processing system 10.

The processing system 10 includes a processing path 12, along which a length of stock 14 will travel. To facilitate motion of the length of stock 14 along the processing path 12, the processing system 10 includes two sets of pinch drives 16. Each pinch drive comprises a pair of rollers 18, which engage the length of stock 14 on complementary sides of the length of stock 14, and moving the length of stock 14 along the processing path 12, either forwardly or rearwardly, as a result of the rollers 18 being correspondingly rotated.

In order to track the relative distance the length of stock 14 has traveled, the processing system additionally includes a pair of measuring disks 20 for engaging the length of stock 14, and rotating as the length of stock 14 travels along the processing path 12. A zero-switch 22 is used to define a zero position by detecting either the beginning or the end of the length of stock 14.

Located along the processing path 12 is a severing station 24 or shearing station, and one or more punch stations 26 or punch presses. In the processing system 10 illustrated in connection with FIG. 2, a pair of punch stations 26 are provided. Each punch station 26 is oriented for producing holes along a different axis. The above-described "Anglemaster" combined punch and shear system may be employed to provide these stations, including the measuring disks 20 and switch 22. The detailed design and operation of the punch and shear apparatus per se that may be used with the process of the present invention forms no part of the present invention.

The Process For Forming Shorter Usable Segments

In connection with processing a length of stock 14 in processing system 10, the processing system 10 requires the length of stock 14 to maintain a certain minimal handling length 28 during processing for properly handling the length of stock. In the processing system 10 shown in connection with FIGS. 1 and 2, the minimum handling length 28 is the distance between the rollers 18 of the pinch drive 16 located closest to the severing station 24, and the severing position 30 of the severing station 24. Contact needs to be maintained with the length of material 14 at the rollers 18 closest to the station 24 to insure proper grip and stability of the remaining length of stock 14 as it is severed at the severing station 24. In the processing system 10 shown in FIGS. 1 and 2, the minimum handling length 28 is a length of approximately eight inches, wherein the rollers 18 and severing station 24 are incorporated as part of the above-described Anglemaster combination punch and shear system. The minimum handling length may be longer or shorter depending upon the type and design of the severing device and the other related components.

As noted in the Background Of The Invention, in order to insure a sufficient minimum length of material is available for purposes of handling the length of stock 14 by the processing system 10, prior processes for forming one or more shorter segments from the length of stock 14 have deducted a length equal to the minimum handling length 28 from the overall length of the length of stock 14 in order to determine the amount of material available for forming one or more shorter usable segments. Unfortunately, this has resulted in a remnant segment or scrap piece which was at least as large as the minimum handling length 28 and which was positioned at the tail end of the length of stock 14.

In contrast, the process of the present invention alters the position of the remnant segment or scrap piece so that it is located at a position other than the last position (i.e. other than at the tail end of the length of stock 14) when at least one of the shorter usable segments has a length greater than the minimum handling length 28. By locating one of the shorter usable segments having a length greater than the minimum handling length 28 at the last position, the portion of the remnant segment reserved in prior art processes for insuring a minimum handling length 28 at the end of the length of stock 14 can be made available for use as part of the one or more shorter usable segments. In at least one presently preferred embodiment of the invention process, the remnant piece, if any, is located or mapped as the second to last piece.

Figure 3:
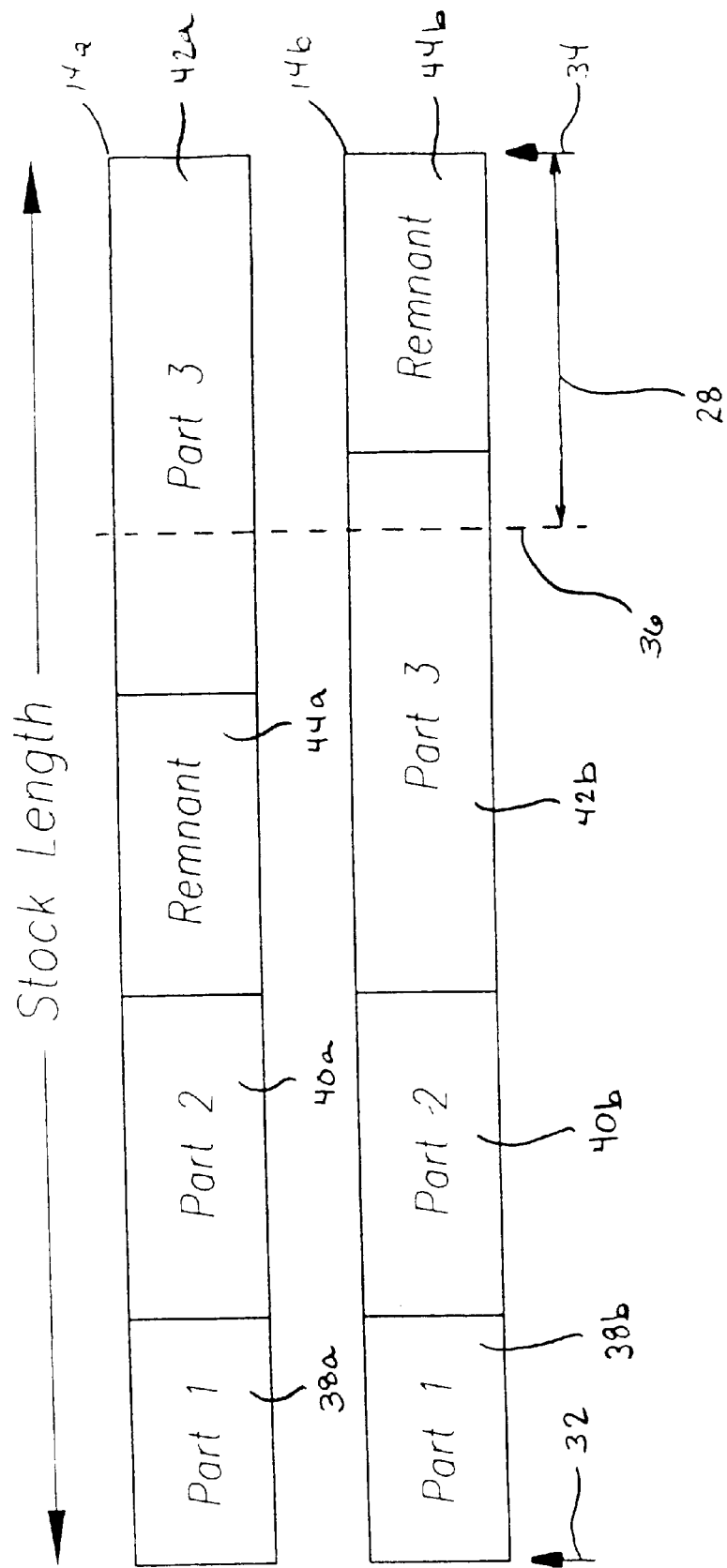
FIG. 3 is a pair of processing order diagrams, each illustrating one or more shorter usable segments mapped onto a length of stock.

FIG. 3 is a pair of processing order diagrams, each illustrating one or more shorter, usable segments mapped onto a length of stock 14a and 14b. Each length of stock 14a and 14b has a leading end 32 and a trailing end 34. Further illustrated in FIG. 3 is a dashed line 36 which defines the front end of the minimum handling length 28, the length of which with respect to the overall length of the length of stock 14a and 14b has been somewhat exaggerated.

The mapping of three smaller usable segments 38b, 40b and 42b, onto the length of stock 14b seriatim from the leading end 32 is illustrated in FIG. 3. Such a mapping of the three smaller usable segments 38b, 40b, and 42b results in a trailing end remnant segment 44b which has a length less than the minimum handling length 28. The severing of the segment 42b from such a short, trailing remnant segment 44b would not be possible because the remnant segment 44b would not be long enough to meet the minimum handling length 28 requirement. However, according to the present invention, a remnant segment, such as segment 44a, can be located at a position other than last position, and one of the usable segments, such as segment 42a which has a length greater than the minimum handling length 28, can instead be located at the trailing end 34 of the length of stock 14a. In this way it is possible to define a mapping or segment layout where the remnant segment 44a has a length as little as zero, and processing of all usable segments is still possible.

In at least one embodiment of the process of the invention, the remnant segment 44a is restricted to the second to last segment location or position. While the remnant segment 44a could be located at any position other than second to last, once the remnant segment 44a is removed, the remnant segment 44a is no longer available to account for inadvertent deviations from the planned processing. Once the remnant segment 44a is removed, the further processing of the remaining shorter usable segments would need to be handled in a relatively precise manner, as any deviation would affect the length of the other remaining, shorter usable segments.

FIG. 4 illustrates a flow diagram of the process 100 for minimizing waste during processing of a length of stock 14. As part of a process 100, initially one or more shorter usable segments are defined, at step 102, so that the usable segments have an aggregate length plus any processing loss, which is less than or equal to the length of stock 14, and so that at least one of the shorter usable segments has a length greater than the minimum handling length. The shorter usable segments are then mapped or laid out, at step 104, onto the length of stock 14, where at least one of the shorter usable segments having a length greater than the minimum handling length is mapped as a last segment located at the trailing end 34 of the length of stock 14.

The length of stock 14 is then loaded into the machine, and the length of stock 14 is advanced, at step 106, for a distance corresponding to the length of the first mapped segment. The step of advancing the length of stock 14 from a leading end 32 to its trailing end 34 need not occur as one continuous motion. Indeed, the length of stock may be moved in discrete smaller increments, so that other intermediary processing (e.g. punching holes) can be performed on the length of stock 14 (i.e., on one or more of the remaining non-severed usable segments). While performing such intermediary processing of the length of stock 14, the length of stock 14 is incrementally moved a distance along the processing path 12, either forwardly or rearwardly, so as to align the length of stock 14 with the appropriate processing stations. In the instance of punching holes, the processing station could be a punching station 26. Once the length of stock 14 is appropriately aligned, the processing station correspondingly performs the desired intermediary processing operation (e.g., punches one or more holes).

After the intermediary processing and prior to severing the leading usable segment from the next usable segment, the length of stock 14 is advanced if necessary, a further distance such that the sum of the distances of all of the incremental advances subsequent to the preceding segment being severed corresponds to the length of the next segment to be severed, and is appropriately aligned with respect to the severing station 24. The advancement distance for all but the next to last segment is preferably determined from the leading end 32 of the remaining length of stock 14. The advancement distance for severing the next to last segment from the last segment is preferably determined from the trailing end 34 of the remaining length of stock 14.

In the processing system 10, shown in FIGS. 1 and 2, the relative position of the length of stock 14 is determined by one of the measuring disks 20. The absolute position is determined by either the leading end 32 or the trailing end 34 passing through the zero switch 22. When the leading end 32 or the trailing end 34 of the length of stock 14 intercepts the zero switch 22, the position of the length of stock 14 in the direction along the axis corresponding to the processing path 12 is set to zero. The rollers 18 of the pinch drive 16 then ultimately advance the length of stock 14 to the next severing position. The next severing position takes into account the physical offset between the zero switch 22 and the severing position 30 of the severing station 24.

Each of the segments are then severed, at step 108, seriatim, from the length of stock 14. As each segment is severed from the length of stock 14, the subsequent severing position is determined from the leading end 32 of the portion of the length of stock 14 remaining, until the severing station 24 cuts off all but the next to the last segment. At this point, the remaining length of stock 14 is advanced until the trailing end 34 breaks the plane of the zero switch 22. The final severing position is then measured for the last segment from the trailing end 34 of the length of stock 14, and the next to last segment is severed from the last segment at the final severing position.

Because the minimal handling length 28 can be provided by one of the shorter usable segments according to the process of the present invention, the remnant segment, if any, need not have a length greater than the minimum handling length, and it can be any length including zero. As a result, the amount of waste can be minimized.

In one preferred application for the process of the present invention, the length of stock includes a structural steel shape, such as an I-beam, channel, angle iron, or bar stock.

It will be readily apparent from the foregoing detailed description of the invention and from the illustrations thereof that numerous variations and modifications may be effected without departing from the true spirit and scope of the novel concepts or principles of this invention.

What is claimed is:

1. A process for minimizing waste during processing of a length of stock into one or more shorter usable segments in a processing system, wherein the system includes a processing path and a fixed position severing station located along the processing path, wherein the processing system has a stock gripping location at a fixed position from said severing station, wherein the processing system has a minimum handling length defined between the severing station and the stock gripping location, and wherein the length of stock is oriented along the processing path with a leading end and a trailing end, said process comprising:

defining one or more shorter usable segments having an aggregate length plus any processing loss, which is less than or equal to the length of stock, wherein at least one of the shorter usable segments has a length greater than the minimum handling length and wherein the difference, if any, between the sum of the lengths of the shorter usable segments plus any processing loss and the length of the length of stock is defined as a remnant segment;

mapping the shorter usable segments on said length of stock wherein one of the shorter usable segments having a length greater than the minimum handling length is mapped as a last segment located at the trailing end of the length of stock and wherein the remnant segment, if any, is mapped as the next to last segment;

moving the length of stock along said processing path without reversing the orientation of the length of stock with respect to said leading end and said trailing end; and severing each of the segments seriatim from the length of stock at a severing position at said severing station according to the following steps:
   (1) severing each segment so that the remaining portion of the length of stock has a new leading end,
   (2) from the leading end of the remaining length of stock, determining the severing position of each remaining segment, except for the severing position of the next to last segment from the last segment, and
   (3) from the trailing end of the remaining length of stock, determining the severing position of the next to last segment from the last segment.

2. A process as claimed in claim 1 wherein moving the length of stock includes advancing the length of stock a distance corresponding to the length of the next segment to be severed, prior to each severing.

3. A process as claimed in claim 2 wherein moving the length of stock a distance corresponding to the length of the next segment to be severed includes a sum of one or more incremental movements of the length of stock rearwardly and forwardly.

4. A process as claimed in claim 3 wherein each incremental movement corresponds to a distance for positioning the length of stock for further intermediate processing.

5. A process as claimed in claim 1 wherein the processing system further includes a zero switch for detecting at least one of the leading end and the trailing end of the length of stock as the length of stock moves along the processing path.

6. A process as claimed in claim 1 wherein the processing system further includes a measuring disk for measuring the distance the length of stock is moved along the processing path.

7. A process as claimed in claim 1 wherein said length of stock is a structural steel shape including at least one of I-beam stock, channel stock, angle iron stock, and bar stock.

8. A process as claimed in claim 1 wherein the processing system further includes one or more processing stations in addition to said severing station for further processing the length of stock as the length of stock moves along the processing path.

9. A process as claimed in claim 8 wherein the one or more processing stations include one or more punch stations for producing physical features in the length of stock as the length of stock moves along the processing path.

* * * * *